(12) United States Patent  
Iwasa

(10) Patent No.: US 6,437,806 B1  
(45) Date of Patent: Aug. 20, 2002

(54) METHOD OF FORWARDING ELECTRONIC MAIL AND A MAILING SYSTEM

(75) Inventor: Mototsugu Iwasa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/314,222

(22) Filed: May 19, 1999

(30) Foreign Application Priority Data

May 20, 1998 (JP) ............................................. 10-137946

(51) Int. Cl.⁷ .................................................. G06F 3/14
(52) U.S. Cl. ...................................... 345/764; 345/744
(58) Field of Search ................................ 345/762, 765, 345/744, 708, 764, 835

(56) References Cited

U.S. PATENT DOCUMENTS

| | | | | |
|---|---|---|---|---|
| 5,438,660 A | * | 8/1995 | Lee et al. ..................... | 345/764 |
| 5,818,447 A | * | 10/1998 | Wolf et al. ................... | 345/744 |
| 6,092,067 A | * | 7/2000 | Girling et al. ............... | 707/100 |
| 6,295,058 B1 | * | 9/2001 | Hsu et al. .................... | 345/764 |

FOREIGN PATENT DOCUMENTS

EP  0653862  5/1995

OTHER PUBLICATIONS

W. Keith Edwards, "The Design and Implementation of the Montage Multimedia Mail System", Communications for Distributed Applications and Systems, Chapel Hill, Apr. 18–19, 1991, pp. 47–57.

"Function and User Interface to Forwarding a Note with Additional Text", Research Disclosure, No. 297, Jan. 1, 1989, pp. 23.

* cited by examiner

Primary Examiner—Cao H. Nguyen  
(74) Attorney, Agent, or Firm—Antonelli, Terry, Stout & Kraus, LLP

(57) ABSTRACT

In an electronic mailing system, a client terminal displays on a screen, a list of mails received by the user of the client terminal and a plurality of destination icons in association with the name of mail recipients, wherein when one of the received mails is overlapped on one of the destination icons through a drag and drop operation on the screen, the selected mail is forwarded to a destination address previously registered in association with the overlapped destination icon.

14 Claims, 9 Drawing Sheets

FIG. 3

| MAIL ID 301 | TITLE 302 | CONTENTS 303 | SENDER 304 | RECIPIENT | |
|---|---|---|---|---|---|
| | | | | DESTINATION MAIL ADDRESS 306 | ATTRIBUTE 307 |
| MAIL 0 | ANNOUNCEMENT OF A CONFERENCE | ... | MAIL ADDRESS 1 | MAIL ADDRESS 0 | TO |
| MAIL 1 | BUSINESS COMMUNICATION | ... | MAIL ADDRESS 2 | MAIL ADDRESS 0 | TO |
| MAIL 2 | BUSINESS TRIP REPORT 1 | ... | MAIL ADDRESS 2 | MAIL ADDRESS 2 | CC |
| MAIL 3 | BUSINESS TRIP REPORT 2 | ... | MAIL ADDRESS 1 | MAIL ADDRESS 1 | TO |
| ... | ... | ... | ... | MAIL ADDRESS 0 | TO |
| | | | | ... | |

207 MAIL INFORMATION

FIG. 4

| USER ID (401) | MAIL ADDRESS (402) | MAIL ID (403) |
|---|---|---|
| USER 0 | MAIL ADDRESS 0 | MAIL 0, MAIL 1 |
| USER 1 | MAIL ADDRESS 1 | MAIL 2 |
| USER 2 | MAIL ADDRESS 2 | MAIL 3 |
| : | : | : |

206 USER INFORMATION

FIG. 5

| DESTINATION ID (501) | NAME OF DESTINATION (502) | MAIL ADDRESS — DESTINATION MAIL ADDRESS (505) | MAIL ADDRESS — ATTRIBUTE (506) | ADDITIONAL TEXT (504) |
|---|---|---|---|---|
| ADDRESS 0 | Mr. A | MAIL ADDRESS 1 | TO | ... |
| ADDRESS 1 | Mr. B | MAIL ADDRESS 2 | TO | ... |
| ADDRESS 2 | C GROUP | MAIL ADDRESS 1 | TO | xxxxxxx ; |
|  |  | MAIL ADDRESS 2 | CC |  |
| : | : | : |  | : |

205 DESTINATION INFORMATION

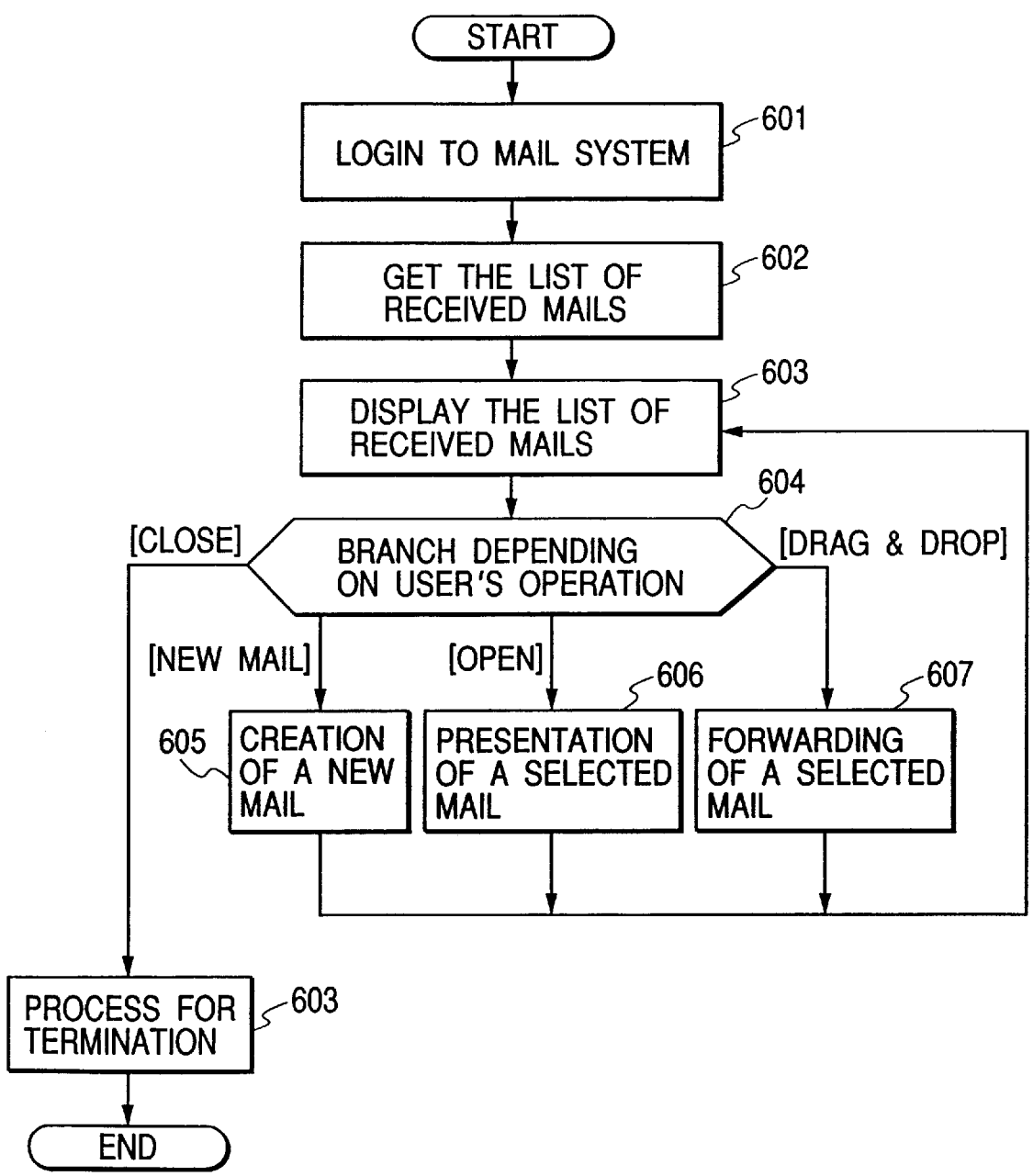

METHOD OF FORWARDING ELECTRONIC MAIL AND A MAILING SYSTEM

BACKGROUND OF THE INVENTION

1. Field of the Invention

The present invention relates to a method of forwarding a mail in an electronic mailing system, and particularly to a method of designating a destination to which one of received mails should be forwarded.

2. Description of the Related Art

The electronic mailing system is available as means for communicating information among distributed computers via a network or as communication means. The electronic mailing system enables efficient communication of information by designating a plurality of destinations at a time to transmit a mail. In conventional methods, for example, as described in Japanese Unexamined Patent Publication No. Hei 5-308376, destinations have been designated. Namely, the destinations of the electronic mail have been designated by directly specifying electronic mail users by using unique identifiers within the network or by creating a table for defining more recognizable aliases for the identifiers of the users and specifying one of the aliases.

In the above related art, to forward a received mail or a text appended within the mail to other persons from a recipient of the mail, GUI (graphical user interface) for specifying destinations has been used to designate the destination of the received mail. That is, a user of a mail client terminal opens a destination list for specifying destinations and selects a forwarding destination among members registered in the list. Such a destination specification method lacks in careful considerations for GUI in designating mail destinations to which a received mail should be forwarded, resulting in posing a problem in terms of user's operability to forward mails.

SUMMARY OF THE INVENTION

An object of the present invention is to provide a method of forwarding a received electronic mail to one or more other persons through simple user's operations.

It is another object of the present invention to provide an electronic mailing system which enables designation of the mail destination to which one of received mails should be forwarded, by intuitive operations.

To achieve the object, a method according to the present invention comprises the steps of: displaying a list of received electronic mails on a display screen; displaying indicators representing candidates of forwarding destinations of the electronic mail on the screen; and accepting selection of one or more electronic mails from said displayed list of received electronic mails and recognizing that said selected received electronic mail is overlapped on one of said indicators representing the candidates of forwarding destinations, and thereby forwarding the selected received electronic mail to a destination corresponding to said overlapped indicator.

The received electronic mails can be displayed in a form of a list of mail titles or a group of mail icons representative the received mails. Similarly, said candidates of the forwarding destinations can also be displayed in a form of a list of destination names or a group of destination icons.

According to the present invention, it is able to represent at least two destinations by one representative indicator so that a received mail can be forwarded to a plurality of destinations by overlapping the selected mail on the representative indicator on the screen.

Further, according to the present invention, it is able to automatically add a predefined routine text or a fixed form of text to the contents of the received electronic mail when the mail is forwarded to said selected destination.

BRIEF DESCRIPTION OF THE DRAWINGS

FIG. 3 is a mail information table storing detailed information of a mail.

FIG. 4 is a user information table updated by a mailing system.

FIG. 5 is a destination information table storing the forwarding destinations of the mail.

FIG. 6 is a flowchart showing a procedure for processing the mail in a client terminal.

DETAILED DESCRIPTION OF PREFERRED EMBODIMENTS

Hereinafter, an embodiment of the present invention will be described with reference to the accompanying drawings.

Figure 2:
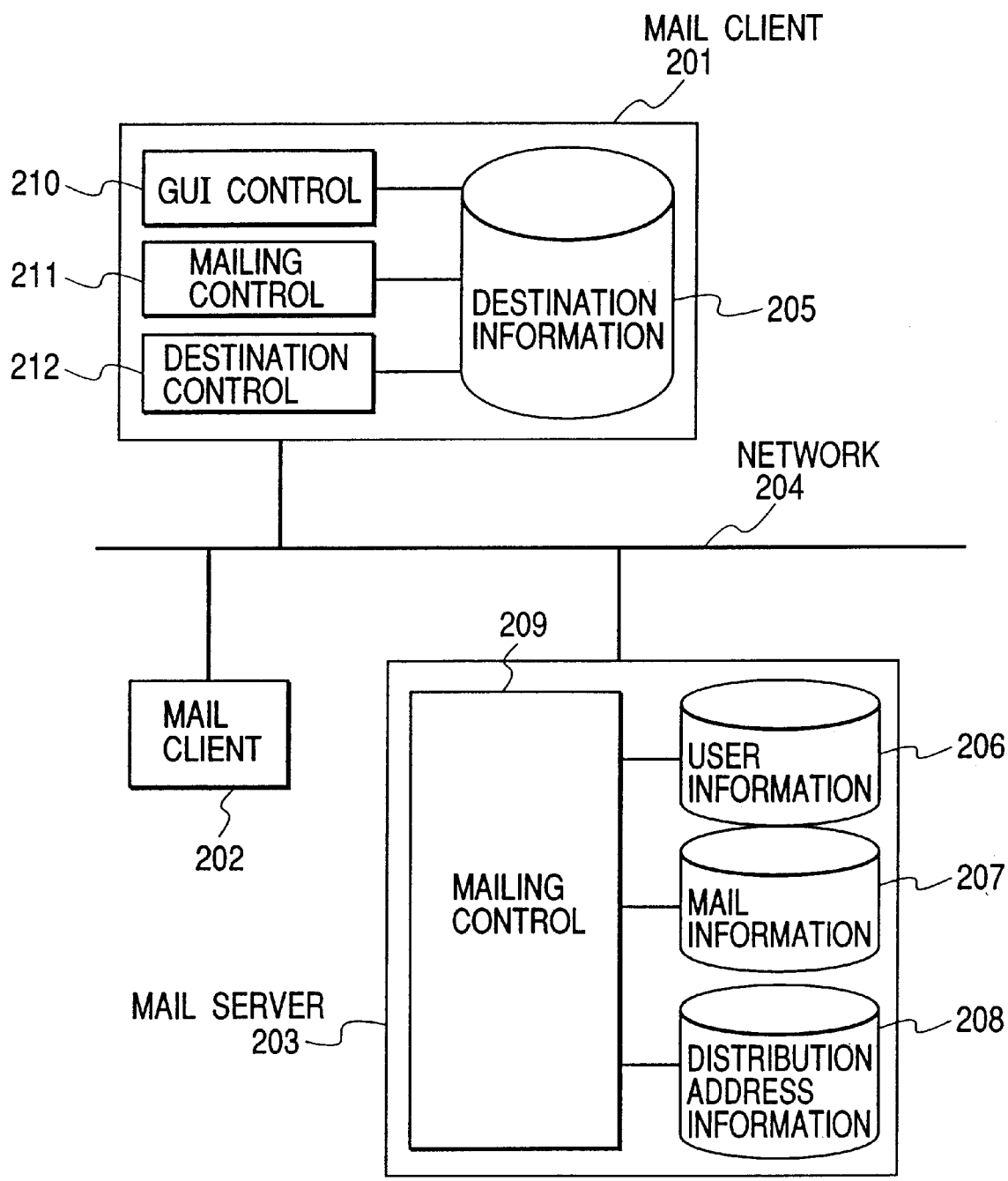
FIG. 2 shows a block diagram of a mailing system according to an embodiment of the present invention.

FIG. 2 shows an example of a configuration of an electronic mailing system that implements the present invention. The system comprises a plurality of computers for use in mail clients 201 and 202, and a mail server 203, connected to a network 204 such as a LAN, WAN, or the like. The computers for the mail clients 201 and 202 are provided with a file for storing a destination information table 205, and programs for GUI control 210, mailing control 211 and destination control 212 in order to send and receive electronic mails. The computer for the mail server 203 is provided with a program for mailing control 209, and files for storing user information table 206, mail information table 207 and distribution address information 208 in order to control distribution of mails sent out from the mail client 201 and 202.

FIG. 3 shows details of the mail information table 207 of FIG. 2. The mail information table 207 comprises a mail ID 301, a title 302, contents 303, a sender 304, and a recipient 305. The mail ID 301 indicates an identifier which is unique in the system and assigned to each of sent mails by the electronic mail system. The title 302 indicates the name of the received mail. The contents 303 indicates the contents of the received mail. The sender 304 indicates the mail address of the mail sender. The recipient 305 includes a destination mail address 306, which indicates the address of a mail recipient, and attribute of the mail 307 in association with the mail recipient. A plurality of mail addresses may be designated as distribution addresses for one mail. The above mail information table 207 can be updated by an electronic mail system when mail sending, deletion, or other events occur.

FIG. 4 shows details of user information table 206 of FIG. 2. The user information table 206 comprises a user ID 401, a mail address 402, and a mail ID 403. The user ID 401 indicates an identifier of a user of the mailing system. The mail address 402 indicates a mail address assigned to the user. In a field of the mail ID 403, the identifiers of received mails are registered for each user. In the user information table 206, the user ID 401 and mail address 402 have been set when the mailing system began to work. The mail identifier field 403 is initially blank, and the contents of this field is updated later by the electronic mailing system upon the occurrence of mail receiving, deletion, or other events. That is, upon receiving a new mail, the identifier of the new mail is added to this field 403, and when the user deletes a received mail, the identifier of the mail is deleted from this field.

FIG. 5 shows details of destination information table 205 of FIG. 2. Destination information table 205 comprises a destination ID 501, a name of a destination 502, a mail address 503, and an additional text 504. The destination ID 501 indicates an identifier of a mail destination created in a mail client, said destination ID being assigned by the electronic mail system to be unique in the mail client. The name of destination 502 is named by the user to make easy the recognition of a mail forwarding address. The mail address 503 includes a destination mail address 505 of a mail to be forwarded and an attribute 506 in association with the mail forwarding. Two or more pairs of destination mail addresses 505 and attributes 506 may be designated for each destination ID. The additional text 504 specifies a text to be inserted in mail contents when a received mail is forwarded based on the destination information table 206. If there is no need to insert a text into a received mail, the field of the additional text 504 is set blank.

Next, a description will be made of a case where a user of a mail client forwards one of the received mails to one of registered persons by referring a list of received mails displayed on the screen.

Figure 1:
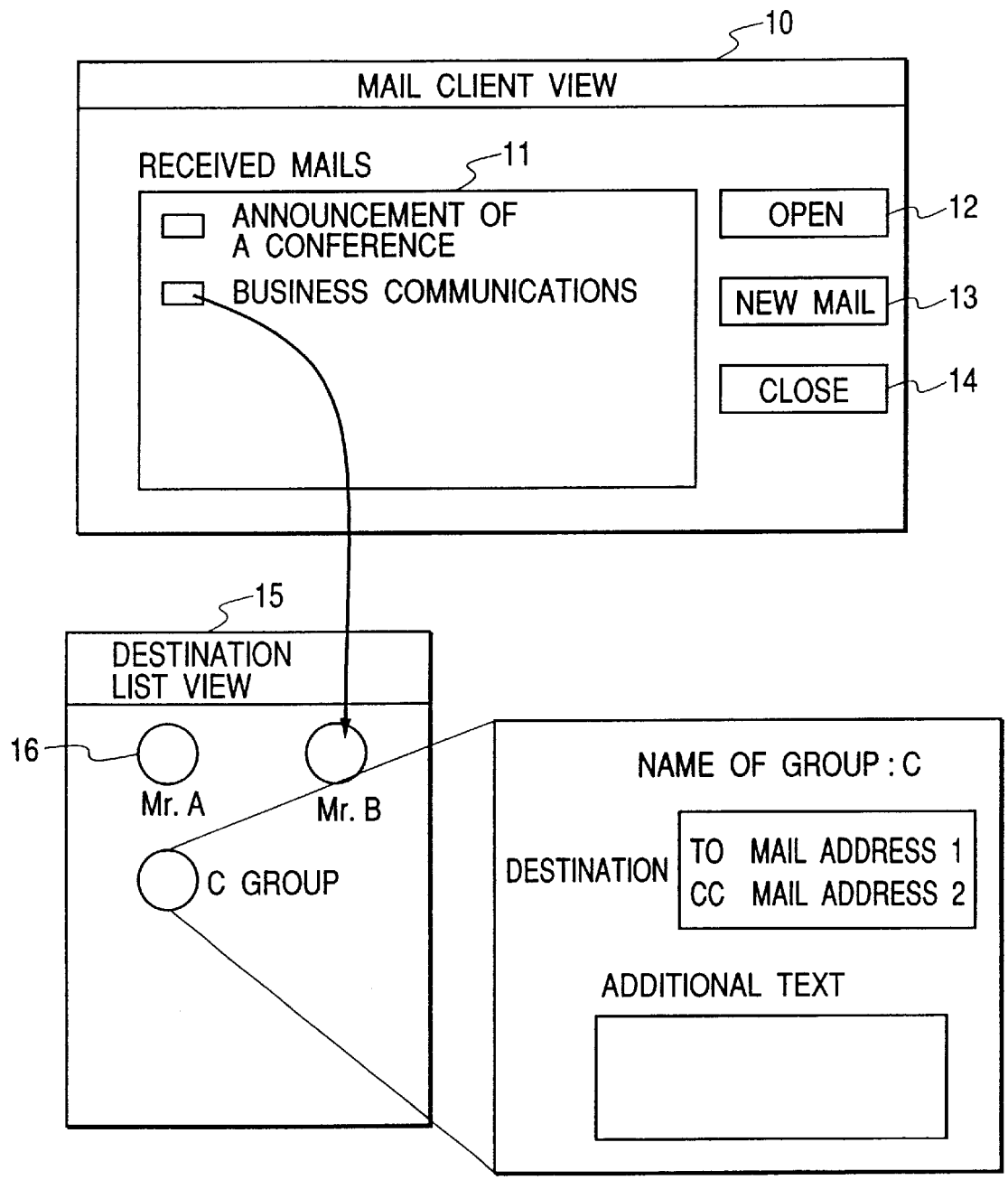
FIG. 1 is a diagram showing a screen of a mailing system according to an embodiment of the present invention.

FIG. 1 outlines operations in a case where a user having user ID "USER 0" registered in user information 206 table of FIG. 4 starts a mail client 201, logs in to a mail server 203, and forwards a mail after confirming received mails.

Figure 7:
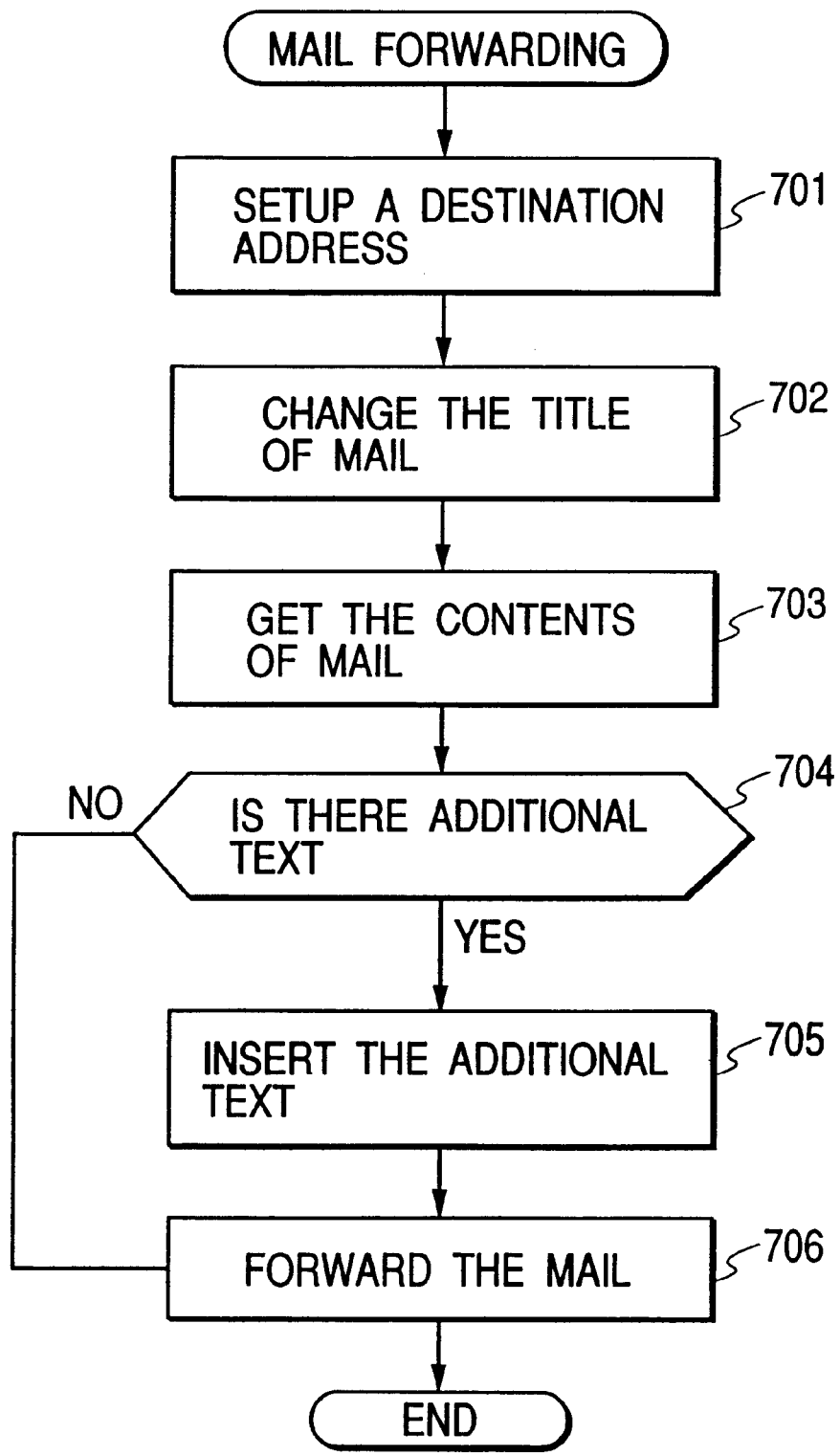
FIG. 7 is a flowchart of a forwarding processing.

FIGS. 6 and 7 show flowcharts executed in the mail client 201 to control such a mail forwarding operation stated above.

The user starts the mail client 201 and logs in (Step 601). After login is approved, the user makes operations to open a mail client view 10 and a destination list view 15 on the display screen. In the mail client view 10 are placed a received mails area 11 and three buttons, an "Open" button 12, a "New Mail" button 13, and a "Close" button 14. The "Open" button 12 is used to refer the contents of one of received mails selected in the received mails area 11. The "New Mail" button 13 is used to create and send a new mail. The "Close" button 14 is used to close the mail client view 10.

After login in Step 601, received mails are obtained in Step 602. That is, as shown in FIG. 1, in order to display a list of received mails destined to the operator of the mail client 201 in the received mails area 11, mail IDs, "MAIL 0" and "MAIL 1" corresponding to the user ID "USER 0" assigned to the operator are obtained from mail ID field 403 of user information table 206 of FIG. 4. Next, mail information table 207 of FIG. 3 is referenced to obtain mail names "Announcement of a conference" and "Business communications" from titles field 302 corresponding to the mail IDs, "MAIL 0" and "MAIL 1". In Step 603, the mail names thus obtained are displayed in the received mails area 11 together with mail icons for indicating received mails. In this Step 603, as shown in FIG. 1, the destination list view 15 is also created on the display screen.

The destination list view 15 includes destination icons 16 created by the electronic mail system based on destination information 205 table (FIG. 5). The number of the destination icons 16 depends on the number of destination records registered in the destination information table 205. Each of the destination icons is associated with the destination ID 501 to reference the information defined in the destination information table 205. When the destination icons 16 are created, the destination ID 501 associated with each icon is used to obtain the destination name 502 in the destination information table 205. The obtained destination name 502 is displayed under the icon 16 as the icon name.

After Step 603, a next step is selected in accordance with the user's operation. If the user operates the "New Mail" button 13, a process to create and send a new mail is executed in Step 605, and thereafter returns to Step 603. If the user operates on the "Open" button 12, Step 606 is executed to present the contents of a received mail which the user selected in the received mails area 11, and thereafter returns to Step 603.

If the user selects one of mails displayed in the received mails area 11 of the mail client view 10 and commands the mail forwarding through a drag and drop operation, Step 607 is executed to forward the selected mail and returns to Step 603. Details of the forwarding operation will be described later by referring to FIG. 7.

In the mail client view 10 of FIG. 1, now assume that the user selects a mail icon associated with a received mail "Business Communications" from the received mails area 11 and overlaps the mail icon on a destination icon named "Mr. B" in the destination list view 15 in order to forward the selected mail to "Mr. B". At this time, the selected mail is forwarded to the mail address of "Mr. B" as follows.

In the mail client 201, first a destination is created in Step 701. In this Step, by referring the destination information table 205 based on a destination ID "ADDRESS 1" associated with the destination icon of "Mr. B", a destination mail address "MAIL ADDRESS 2" is obtained as a forwarding destination address. The destination mail address "MAIL ADDRESS 2" is set for the destination of the mail to be forwarded. Then the attribute 506 of the destination mail address is also obtained from the destination information table 205 and attached at the head portion of the destination of the mail to be forwarded. For example, if the attribute is "TO", destination mail address is preceded by "TO", and if the attribute is "CC", a destination mail address is preceded by "CC", so that the mail recipient can recognize the responsibility for the received mail.

As in the case of a destination ID "ADDRESS 2" in FIG. 5, two or more pairs of destination mail addresses 505 and attributes 506 may be registered for one destination ID. If a destination ID associated with a destination icon selected as a forwarding destination contains a plurality pairs of destination mail addresses and attributes, the same mail is forwarded to a plurality of persons based on these destination mail addresses and attributes.

According to the present invention, by overlapping a selected mail icon on a destination icon through drag & drop operation, it is able to forward the selected mail at a time to a plurality of destination mail addresses registered in association with the destination icon. In other words, the user can forward a mail to a plurality of mail addresses through the same operations as for a destination icon which is associated with only one destination address.

After a destination is created as stated above, the title of the mail is changed in Step 702 as follows. The mail information table 207 is referenced first based on the mail ID "MAIL 1" of the selected mail "Business communications" to obtain a title 302 thereof, then a symbol (character string) for indicating that the mail is forwarded one is added to the title, and the title thus amended is set as the title of the mail. Next, the contents of the mail are obtained in Step 703 by referring the mail information table 207 based on the mail ID "MAIL 1" to obtain the contents 303 of the selected mail having the tile "Business Communications".

At Step 704, a field of the additional text 504 of destination information table 205 is referenced based on a destination identifier associated with the selected destination icon to determine whether any additional text is registered for the destination. If there exists an additional text, for example, such a text "xxxx . . . xxx" registered in a record of the destination ID "ADDRESS 2", Step 705 is carried out to insert the additional text into the contents of the selected mail obtained in Step 703 to form a mail to be forwarded. If there is no additional texts, the mail contents obtained in Step 703 directly forms the contents of the mail to be forwarded. The additional text, which is a fixed form of routine text for use in the mail transfer, is inserted at a predetermined position, such as the head portion of mail contents.

The mail created as described above is sent in Step 706 then terminating a series of forwarding operations. Upon termination of the forwarding processing in the mail client, the mail server 203 creates a new mail ID (e.g., "MAIL 3") for the forwarded mail and registers the mail information in the table 207. Furthermore, as a receiving processing for the registered mail, the mail server searches for a user having the mail address 402 corresponding to the destination of the forwarded mail from the user information table 206 of FIG. 4, and adds the mail ID of the forwarded mail, for example, "MAIL 3", in the above example, to the field of the mail ID 403 in a record associated with the destination user.

Although FIG. 1 shows an example that a mail icon for the received mail "Business Communications" is selected to drag and drop to a destination icon, a plurality of received mails may be selected to forward to one or more of destinations through drag and drop operations of the mail icons. In this case, the forwarding processing of FIG. 7 is carried out for each of the selected.

Figure 8:
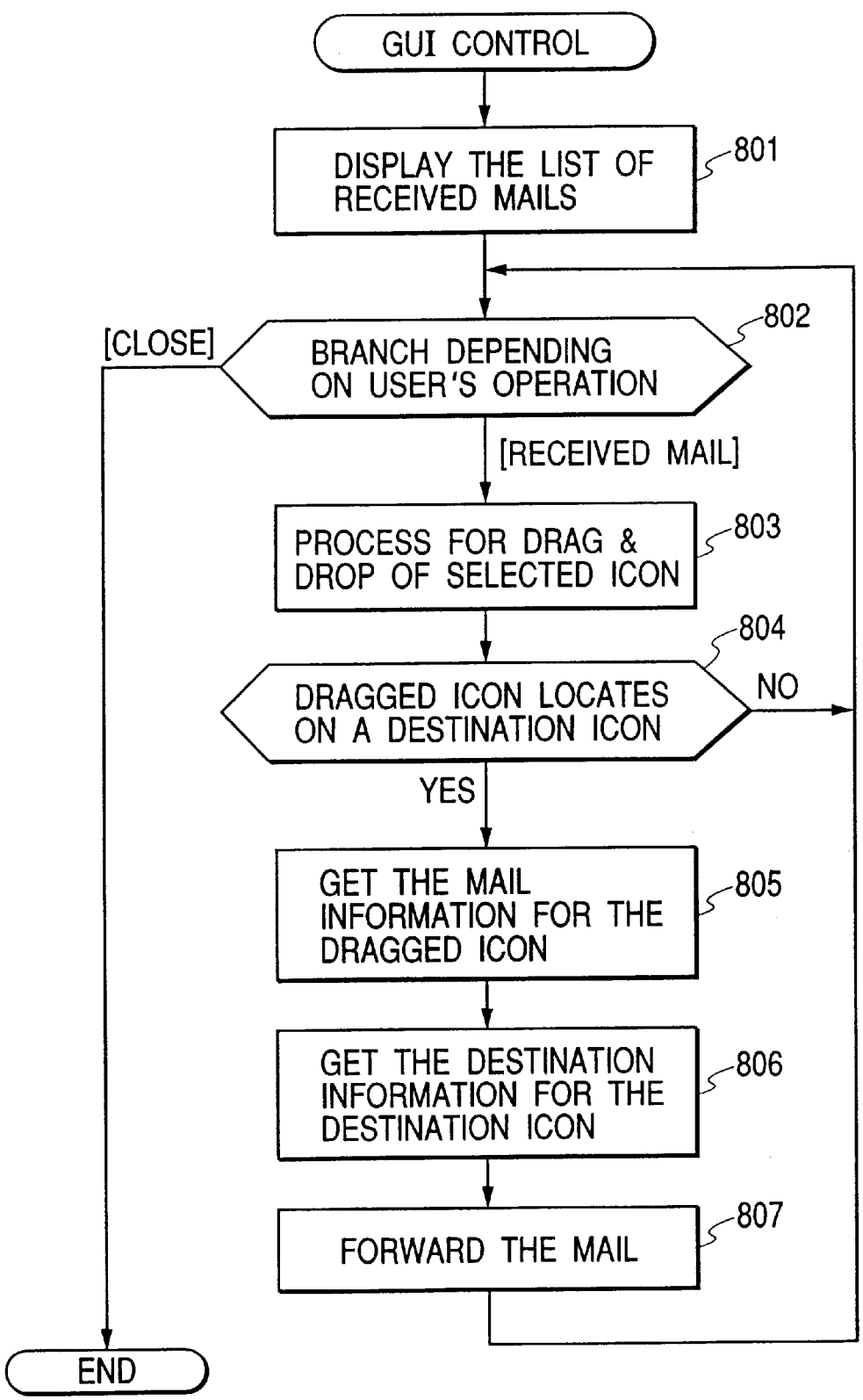
FIG. 8 is a flowchart of a GUI control 210 to forward a received mail by dragging the mail to a destination icon.

FIG. 8 shows processing of the GUI control 210 to forward a received mail by dragging a mail icon to a destination icon. After logging in to the mail system, the user creates the mail client view 10 on the screen to confirm received mails destined for the user (Step 701). Then, the GUI control processing branches depending on a user's operation (Step 802). In this case, the user may select the "Close" button 14 or one of the mail icons displayed in the mail client view 10. If the "Close" button is selected, the GUI control terminates. When one of received mails is selected by picking a mail icon, Step 803 is carried out to drag and drop the selected icon. Upon termination of the drag and drop operation, the ending point of the mail icon is detected to determine whether a destination icon exists in that position (Step 804). If no destination icon exists in the ending point, the GUI control returns to Step 802 to wait for the next user's operation. If a destination icon exists in the ending point of the dragged and dropped icon, the following processing is performed. First, information of selected received mail is obtained from the information table 207 (Step 805). Next, destination information corresponding to a destination icon located at the ending point of the selected mail icon is obtained from table 205 (Step 806). Then the mail is forwarded based on mail information and the destination information obtained in Steps 805 and 806 (Step 807).

Figure 9:
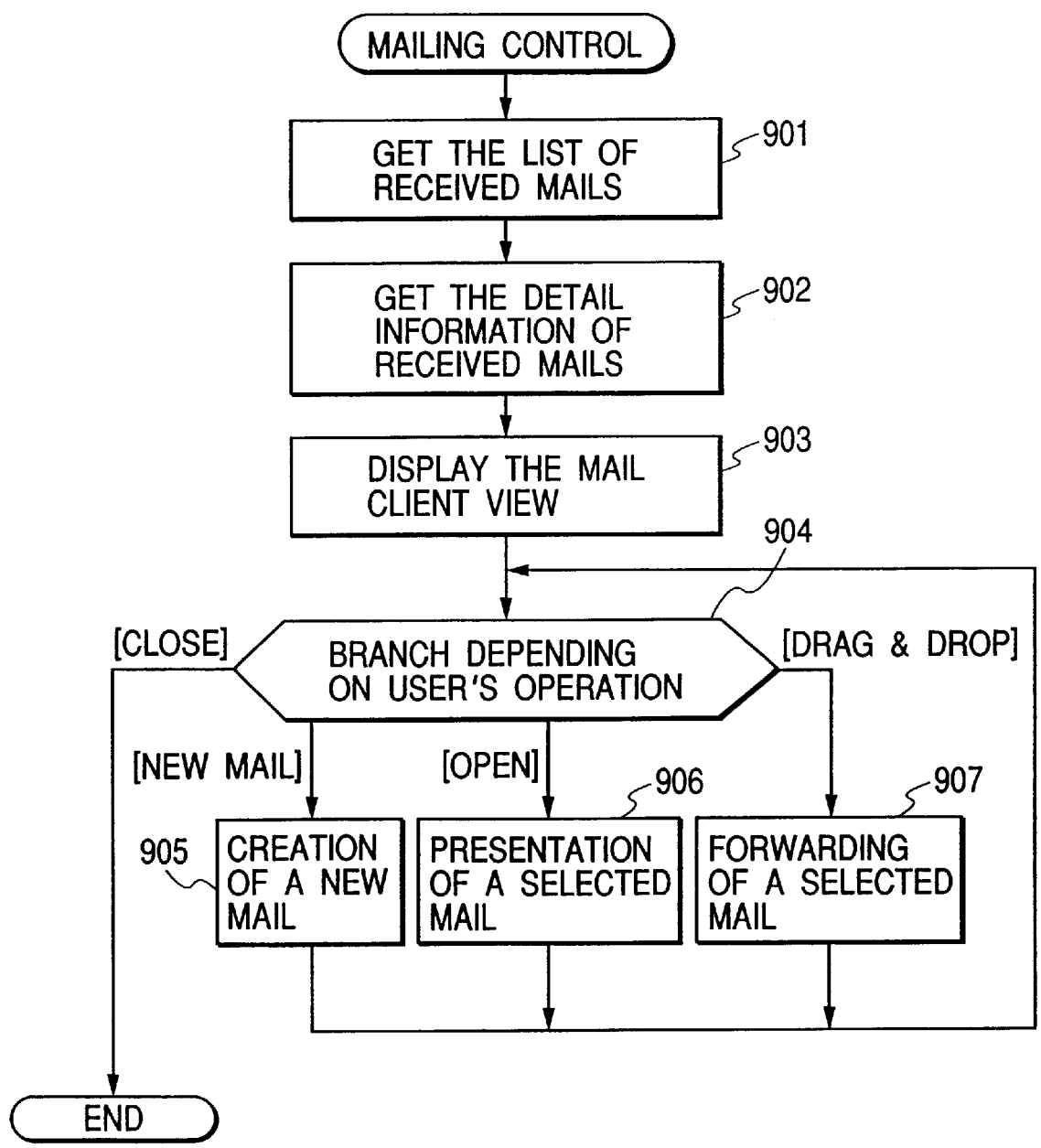
FIG. 9 is a flowchart of mail control 211 to receive, forward and refer a mail.

FIG. 9 shows a flowchart of the mailing control 211 carried out in a mail client to receive, forward, or refer a mail. In the mailing control routine, a list of received mails is obtained in Step 901, and mail IDs associated with the user ID of the user (operator) of the mail client are obtained from the mail ID field 403 of user information table 206 of FIG. 4 to display a list of mails received by the user in the received mails area 11. In Step 902, titles 302 are obtained from the mail information table 207 of FIG. 3 based on the mail IDs obtained in Step 901. In Step 903, a mail client view 10 is created by using the mail information obtained in Step 902. In Step 904, the next user's operation is judged. If the user selects "Close" button, this mailing control routine is terminated. If "New Mail" button is selected, a new mail is created in Step 905 is performed. If the user selects "Open" button, reference process of a selected mail is performed in Step 906. If the user drags a mail icon, Step 907 is performed to forward the selected mail by drag & drop operation. After execution of Steps 905, 906, or 907, the mail control returns to Step 904.

Figure 10:
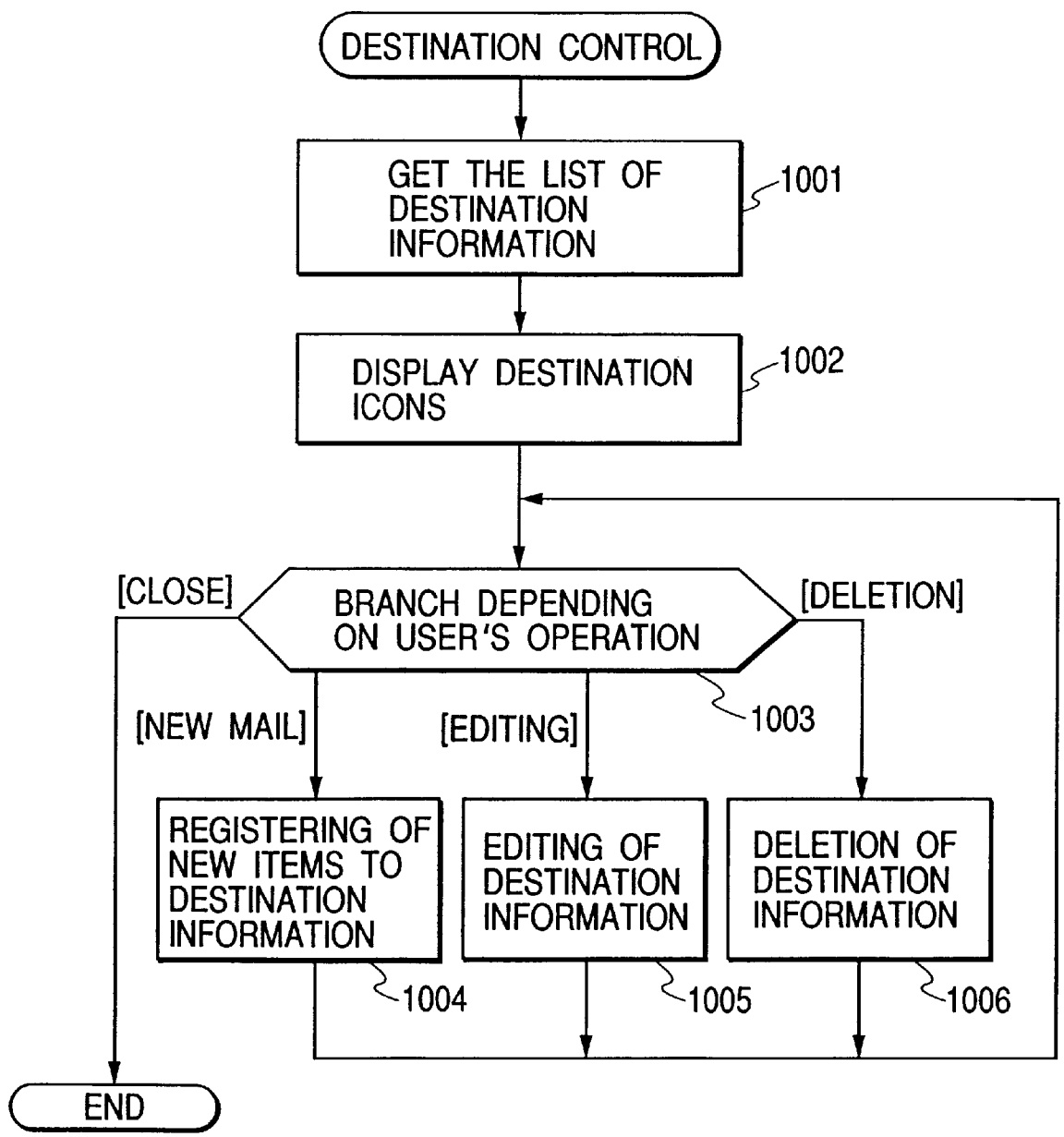
FIG. 10 is a flowchart of destination control 212 to create and edit destination information.

FIG. 10 shows a flowchart of destination control to create or edit destination information in the mail client. When the user logs in to the mail system, the destination information table 205 of FIG. 5 is referred to obtain the contents of the destination name field 502, "Mr. A", "Mr. B", and "C Group", and the contents of the destination ID field 501, "ADDRESS 0", "ADDRESS 1", and "ADDRESS 2" in Step 1001. Using these destination names, destination icons with "Mr. A", "Mr. B", and "C Group" are created in the destination list view 15 in Step 1002. In the next Step 1003, the destination control branches depending upon a user's operation to one of the following processes: registering new items to destination information (Step 1004), editing destination information (Step 1005), and deleting destination information (Step 1006), and closing the routine. If "New Mail" button is selected, Step 1004 is executed. If "Editing" is selected, editing in Step 1005 is executed. If "Deletion" is selected, deletion processing in Step 1006 is executed. If "Close" is selected, the destination control is terminated. After execution of Steps 1004, 1005, or 1006, the destination control returns to Step 1003.

In Step 1004, information of "Name of destination", "Destination mail address", "Attribute", and "Additional text" is received from the user and registered in the destination information table 205 as new items. In Step 1005, a destination mail address 505, an attribute 506, and an additional text 504 are retrieved from the destination information table 205 based on the destination IDs obtained in Step 1001 and these data are displayed on the screen. In Step 1006, destination information is selectively deleted from the destination information table 205 by using destination IDs obtained in Step 1001. Then, one or more icons corresponding to the deleted destinations are deleted from the destination list view 15.

As has been described above, according to the present invention, each user can forward received mails to other concerned persons by simply overlapping the received mails on one of indicators such as destination icons on the screen, in advance registered as forwarding destinations. Therefore, each user can easily forward received mails by intuitive operations on the screen. If a plurality of destinations are represented by one destination icon, the user can forward a received mail to a plurality of destinations by simply overlapping the mail on one destination icon, resulting in facilitating mailing operations and management. Furthermore, according to the present invention, by automatically adding a routine text to the contents of the received mail during the mail forwarding, the user can forward received mails without additional key operations to create a fixed form of text for the respective recipients of the mails.

What is claimed is:

1. A method of forwarding an electronic mail, comprising the steps of:

displaying a list of received electronic mails;

displaying indicators representing candidates of forwarding destinations of an electronic mail;

accepting selection of at least one electronic mail from said displayed list of received electronic mails and recognizing that said selected electronic mail is overlapped onto one of said indicators representing the candidates of forwarding destinations; and forwarding the selected received electronic mail with a destination mail address corresponding to said overlapped indicator to a mail server.

2. A method of forwarding an electronic mail according to claim 1, further including the steps of:

displaying at least two candidates of forwarding destinations by one representative indicator;

recognizing that a received electronic mail is overlapped onto said representative indicator; and forwarding the received electronic mail to a plurality of destination mail addresses in association with said overlapped indicator through a mail server.

3. A method of forwarding an electronic mail according to claim 2, wherein said indicators are destination icons.

4. A computer-readable memory medium for storing a program for implementing a method according to claim 2.

5. A method of forwarding an electronic mail according to claim 1, further comprising the step of automatically adding a predefined text to the received electronic mail to be forwarded.

6. A method of forwarding an electronic mail according to claim 5, wherein said predefined text is a routine document.

7. A computer-readable memory medium for storing a program for implementing a method according to claim 5.

8. A computer-readable memory medium for storing a program for implementing a method according to claim 1.

9. A mail system comprising:

means for displaying a list of received electronic mails on a display screen;

means for displaying indicators representing candidates of forwarding destinations of an electronic mail on said display screen; and a mail controller for accepting selection of at least one electronic mail from said displayed list of received electronic mails, recognizing that said selected electronic mail is overlapped onto one of said indicators representing the candidates of the destinations, and forwarding the selected received electronic mail with a destination mail address corresponding to said overlapped indicator to a mail server.

10. A mail system according to claim 9, further comprising:

memory means for storing at least one destination address associated with each of said indicators representing the candidates of the destinations of electronic mails.

11. A mail system according to claim 9, wherein said indicator are icons.

12. A mail system according to claim 9, further comprising memory means for storing a text to be added to a mail associated with one of said indicators representing the candidates of the destinations.

13. A method of forwarding an electronic mail from a client computer in an electronic mailing system, comprising the steps of:

displaying indicators of electronic mails received by the client computer on a display screen;

displaying icons each representing destination of an electronic mail on the display screen according to destination information prepared in the client computer;

sensing one of said icons specified by dropping a dragged one of said indicators on the display screen; and forwarding one of said received electronic mails corresponding to said dragged indicator, with a destination mail address corresponding to the specified icon, to a mail server.

14. A method of forwarding an electronic mail according to claim 13, wherein a user name of one of said destinations is displayed on the display screen in association with each of said icons based on said destination information.

* * * * *